United States Patent Office 3,454,591
Patented July 8, 1969

3,454,591
HERBICIDAL 3-METHYL-5-UREIDOISOTHIAZOLES
Heinz Schulz, Friedrich Arndt, Georg-Alexander Hoyer, and Reinhart Rusch, Berlin, Germany, assignors to Schering A.G., Berlin, Germany
No Drawing. Filed Apr. 21, 1966, Ser. No. 550,875
Claims priority, application Germany, May 8, 1965, Sch 37,022
Int. Cl. C07d 91/32
U.S. Cl. 260—306.8            11 Claims

ABSTRACT OF THE DISCLOSURE

Novel 3 - methyl - 5 - ureidoisothiazoles are provided which may be utilized as selective herbicides.

---

The invention relates to novel derivatives of urea and thiourea. More particularly, it relates to urea and thiourea derivatives having herbicidal effects, and distinguished by their selectivity as to herbicidal effects.

Heretofore, urea derivatives having herbicidal effects have been known, however, the selectivity of such known agents has not always been satisfactory.

It now has been found that compounds of the formula

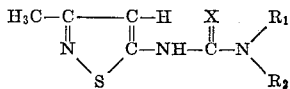

wherein X is oxygen or sulfur, $R_1$ is hydrogen or lower alkyl, and $R_2$ is alkyl or cycloalkyl, are effective herbicides, and are superior to the known urea derivatives in their selectivity.

Compositions containing at least one of these urea compounds have a surprising effect on many kind of weeds when employed in desirably small amounts. Contrary to known urea derivatives, they can be used without detrimental effects on various economically valuable crops which include also important vegetable crops; such as freshly sown onions, freshly sown leeks, and chives. When employed in amounts of 0.5 to 1 kg. of active agent per hectare, the compounds of the invention destroy field weeds such as *Chenopodium album, Spergula arvensis, Lamium amplexicaule, Polygonum convolvolus, Polygonum lapathiolium, Senecio vulgaris, Thlaspi arvense, Urtica urens, Papaver ssp., Galinsoga parviflora, Capsella bursa pastoris, Raphanus raphanistrum, Stellaria media, Matricaria chamomilla,* and *Sonchus oleraceus.* Onions, leeks, and chives sown in the same area, however, are not damaged.

The herbicidal agents of the invention may be applied simultaneously with or after seeding, and it is also possible to treat leafy crops of the afore-mentioned vegetables directly without damaging them.

Many weeds, some of which heretofore could be fought only with difficulty, such as chamomilla, *Senecio vulgaris, Galinsoga parviflora, Sonchus oleraceus, Lamium amplexicaule,* and *Chenopodium album,* can now be effectively attacked over a wide period of the growing season.

The agents of the invention are therefore also superior to the herbicides employed heretofore in onion fields, such as isopropyl-N-3-chlorophenylcarbamate which are not adequately effective against such field weeds. Aside from onions, leeks and chives, grain and corn crops can also be treated with great success against weeds without crop damage. It is further possible to destroy weeds in cabbage crops and in sown radishes. Furthermore, one of the compounds namely 3-methyl-5-N-methylureidoisothiazole employed in the herbicidal compositions of the invention is suitable for combating weeds in waste land.

The new active agents of the compositions of the invention are prepared in well known manner, by the reaction of 3-methyl-5-aminoisothiazole with either (a) the corresponding alkylisocyanates or alkylisothiocyanates in an inert organic solvent, or with (b) carbamoyl or thiocarbamoyl chlorides in the presence of an acid receptor, such as an inorganic or organic base, preferably pyridine.

(I)

Preparation of 3-methyl-5-N-methylureidoisothiazole according to method (a) above.—150 g. (0.88 mole) 3-methyl-5-amino-isothiazole were dissolved in 960 ml. anhydrous tetrahydrofuran, and 59.5 ml. (1.0 mole) methyl isocyanate were added drop by drop. The compound resulting began crystallizing after a few minutes during which the reaction is distinctly exothermic. The reaction mixture was refluxed for three hours to complete the conversion. It was then permitted to cool, filtered with suction and the resultant precipitate was washed with ether, whereupon 210 g. of a product of M.P. 217.5° to 219° C. were obtained. An additional 12.5 g. of the product (M.P. 216°–218° C.) were obtained upon partial evaporation of the mother liquor. The total yield therefore, was 222.5 g., corresponding to 98.9% of theory.

When recrystallized from acetonitrile or water, a colorless product having a M.P. 222° to 223° C. was obtained which was analyzed as follows:

Calculated: N, 24.54%; S, 18.73%. Found: N, 24.34%; S, 18.45%.

Suitable solvents that may be used other than tetrahydrofuran include other ethers as well as aromatic hydrocarbons and ketones, such as acetone, methylethyl ketone, etc.

(II)

Preparation of 3 - methyl - 5 - N,N-dimethylureidoisothiazole according to method (b) above.—11.4 g. (0.1 mole) 3 - methyl - 5 - amino - isothiazole were dissolved in 30 ml. pyridine and mixed with 11 g. (0.1 mole) dimethylcarbamoyl chloride. The mixture slowly and spontaneously heated up. When the temperature reached 50° C., the mixture was cooled with ice water, and was left to stand over night, whereupon it was poured on ice. A resultant yellowish brown powder precipitate was filtered off with suction, washed with water, and then dried in a desiccator, 3.5 grams of the product were obtained. The melting point was 175° C., decomposition, after recrystallization from acetonitrile. The structure was made probable by infrared spectrum (intensive carbonyl bands).

A few other active agents of the invention prepared according to the methods described above are listed below.

Compound: Melting point, ° C.
- 3-methyl-5-N-methyl-ureidoisothiazole — 222–223
- 3-methyl-5-N-ethyl-ureidoisothiazole — 191–193
- 3-methyl-5-N-propyl-ureidoisothiazole — 164–166
- 3-methyl-5-N-isopropyl-ureidoisothiazole — 199–200
- 3-methyl-5-N-n-butyl-ureidoisothiazole — 138–139
- 3 - methyl - 5 - N-cyclohexyl-uredioisothiazole — 200–201
- 3 - methyl - 5 - N-methyl-thioureidoisothiazole — 209–210
- 3-methyl-5-N-ethyl-thioureidoisothiazole — 195–196
- 3 - methyl - 5-N-isopropyl-thioureidoisothiazole — 205
- 3 - methyl - 5 - N,N-dimethyl-ureidoisothiazole — 175 (decomp.)

The active agents of the invention may be employed singly or in mixtures with each other and/or with other herbicides, such as derivatives of urea, carbamates, anilides, triazines, and/or with other materials, such as fertilizers. The active agents are preferably compounded in the customary manner for combating weeds, for example, in powders, spreadable compositions, granulates, solutions, emulsions or suspensions, with added liquid and/or solid carriers or diluents, and also with wetting agents, adhesion promoters, emulsifiers and/or dispersing agents.

The various conpositions are prepared in the usual manner, for example, by grinding or mixing, as is customary in crop protecting materials, liquid or solid inert carriers or diluents, and surfactants being added as needed. Suitable solid carriers in the resultantly used compositions include lime, kaolin, chalk, talcum, natural or synthetic silica, attaclay, and other types of clay. Liquid carriers or diluents are less suitable because the very limited solubility of many active agents of the invention in organic solvents. Applicable surfactants include salts of lignosulfonic acid, polyethoxylated amines and alcohols, esters of alkylaryl polyglycol ethers, salts of alkylated benzenesulfonic acids, and sulfonated acid amides and their salts.

The following examples further illustrate the invention.

EXAMPLE 1

One kilogram per hectare of each active agent listed in the table was suspended in 800 liters water per hectare and applied by spraying to young plants of onions and *Galinsoga parviflora* after germination. It was found that the agents of the invention did not damage the onion crop whereas they destroyed the *Galinsoga parviflora* weeds. By way of comparison, the isopropyl-N-3-chlorophenyl-carbamate, which is commonly employed as a herbicide in onion crops, did not attach the *Galinsoga parviflora*. Other urea derivatives which have become known as herbicides, and the mixture of butinyl-N-3-chlorophenyl-carbamate and N-cyclooctyl-N',N'-dimethyl-urea also destroyed the crop plants.

| Active agents | Effectiveness Onions | *Galinsoga p.* |
|---|---|---|
| 3-methyl-5-N-methyl-ureidoisothiazole | 10 | 0 |
| 3-methyl-5-N,N-dimethyl-ureidoisothiazole | 10 | |
| 3-methyl-5-N-ethyl-ureidoisothiazole | 10 | 2 |
| 3-methyl-5-N-n-butyl-ureidoisothiazole | 10 | 0 |
| 3-methyl-5-N-cyclohexyl-ureidoisothiazole | 10 | |
| 3-methyl-5-N-methyl-thioureidoisothiazole | 10 | 0 |
| 3-methyl-5-N-n-propyl-ureidoisothiazole | 10 | 0 |
| 3-methyl-5-N-isopropyl-ureidoisothiazole | 10 | 0 |
| 3-methyl-5-N-isopropyl-thioureidoisothiazole | 10 | 2 |
| N'-3,4-dichlorophenyl-N,N-dimethylurea | 0 | 0 |
| N'-3,4-dichlorophenyl-N-methoxy-N-methylurea | 0 | 0 |
| Butinyl-N-3-chlorophenyl-carbamate+N-cyclooctyl-N'-,N'-dimethylurea | 0 | 0 |
| Isopropyl-N-3-chlorophenyl-carbamate | 10 | 10 |
| Untreated | 10 | 10 |

0=Totally destroyed. 10=Undamaged.

EXAMPLE 2

The active agents listed below were applied by spraying cherlock (*Sinapis arvensis*) and tomatoes, used as test plants in greenhouse experiments, in amounts of 10 kg. active agent suspended in 800 liters water per hectare. The herbicidal effect of the agents according to the invention is evident from the results.

| Active agents | Sinapis | Tomatoes |
|---|---|---|
| 3-methyl-5-N-methyl-ureidoisothiazole | 0 | 0 |
| 3-methyl-5-N,N-dimethyl-ureidoisothiazole | 0 | 0 |
| 3-methyl-5-N-n-butyl-ureidoisothiazole | 0 | 0 |
| 3-methyl-5-N-ethyl-ureidoisothiazole | 0 | 0 |
| 3-methyl-5-N-cyclohexyl-ureidoisothiazole | 1 | 1 |
| 3-methyl-5-N-methyl-thioureidoisothiazole | 0 | 0 |
| 3-methyl-5-N-n-propyl-ureidoisothiazole | 0 | 0 |
| 3-methyl-5-N-isopropyl-ureidoisothiazole | 0 | 1 |
| 3-methyl-5-N-ethyl-thioureidoisothiazole | 2 | 5 |
| 3-methyl-5-N-isopropyl-thioureidoisothiazole | 0 | 1 |
| Untreated | 10 | 10 |

0=Totally destroyed. 10=Undamaged.

EXAMPLE 3

Sown onions (strain "yellow Zittsuer"), sown leeks of strain "Elefant," and chives were treated in an open field prior to germination with 3-methyl-5-N-methyl-ureidoisothiazole and isopropyl-N-3-chlorophenyl-carbamate, for comparison, at the rates indicated below. The herbicidal agent of the invention had a substantially better weed-killing effect in an amount which was one-sixth of the amount of the compared material.

| Active agents | Amount of active agent, kg./ha. | Onions | Leeks | Chives | *Stellaria media* | *Lamium amplexicaule* | *Urtica urens* | *Galinsoga parviflora* |
|---|---|---|---|---|---|---|---|---|
| 3-methyl-5-N-methyl-ureido-isothiozole | 0.5 | 9–10 | 9–10 | 10 | 0 | x | 0 | 0 |
| Isopropyl-N-3-chlorophenyl-carbamate | 3 | 9–10 | 9–10 | 10 | 0 | xxx | 0 | xxx |
| Untreated | | | | | xxx | xxx | xxx | x |

Evaluation scale for crop plants: 0=Totally destroyed. 10=Undamaged.
Evaluation scale for weed: 0=Free of weed. x=Weed present. xxx=Weed dominating.

| Active agents | Amount of active agent, kg./ha. | *Senecio vulgaris* | *Polygonum lapathifolium* | *Polygonum onvolvulus* | *Sonchus oleraceus* | *Chenopodium album* | *Raphanus raphanistrum* | *Capsela bursa pastoris* | *Spergula arvensis* |
|---|---|---|---|---|---|---|---|---|---|
| 3-methyl-5-N-methyl-ureidorisothiozole | 0.5 | 0 | 0 | 0 | 0 | 0 | 0 | 0 | 0 |
| Isopropyl-N-3-chlorophenyl-carbamate | 3 | x | 0 | 0 | 0 | 0 | 0 | 0 | 0 |
| Untreated | | xxx | x | x | x | x | x | x | x |

Evaluation scale for crop plants: 0=Totally destroyed. 10=Undamaged.
Evaluation scale for weed: 0=Free of weed. x=Weed present. xxx=Weed dominating.

EXAMPLE 4

Onions, corn and weeds were treated in an open field before and after germination with 3-methyl-5-N-methyl-ureidoisothiazole and with two urea derivatives which are known herbicides at a rate of 1 kg. active agent suspended in 800 liters water per hectare. The compound of the invention showed excellent effects against weeds and good selective compatibility with sown onions and corn. This selective compatibility was not observed with the known urea derivatives.

compatibility with the various types of cabbage while having good herbicidal effects against weeds.

|  | 3-methyl-5-N-methyl-ureido-isothiazole | Untreated |
|---|---|---|
| White cabbage (Brassica oleracea var. capitata L.) | 8 | 10 |
| Kohlrabi (Brassica oleracea var. gongylodes L.) | 8.6 | 10 |
| Curled cabbage (Brassica oleracea var. sabauda L.) | 9.6 | 10 |
| Brussels sprouts (Brassica oleracea var. gemmifera (DC) Thell | 8.2 | 10 |
| Cauliflower (Brassica oleracea var. botrytis L.) | 10 | 10 |
| Green cabbage (Brassica oleracea var. acephala f. crispa (DC) | 10 | 10 |
| Red cabbage (Brassica oleracea var. capitata f. rubra L.) | 8.6 | 10 |
| Polygonum convolvulus | 1.5 | 10 |
| Chenopodium album | 1.7 | 10 |
| Spergula arvensis | 1.0 | 10 |

0=Totally destroyed.   10=Undamaged.

| Active agents | Corn | Onions | Chenopod iumalbum | Lamium amplexi-caule | Senecio vulgaris | Thlaspi arvense | Urtica urens | Papaver ssp. | Galinsoga parviflora |
|---|---|---|---|---|---|---|---|---|---|
| 3-methyl-5-N-methylureidoisothiozole: | | | | | | | | | |
| (a) | 10 | 10 | 0 | 0 | 0 | 0 | 0 | 0 | 0 |
| (b) | 10 | 10 | 0 | 0 | 0 | 0 | 0 | 0 | 0 |
| N'-3,4-dichlorophenyl-N-methoxy-N-methyl-urea: | | | | | | | | | |
| (a) | 10 | 0 | 0 | 0 | 0 | 0 | 0 | 0 | 0 |
| (b) | 7 | 0 | 0 | 0 | 0 | 0 | 0 | 0 | 0 |
| N'-4-chloro-phenyl-N-methyl-urea: | | | | | | | | | |
| (a) | 7 | 0 | 0 | 0 | 0 | 0 | 0 | 0 | 0 |
| (b) | | | | | | | | | 0 |
| Untreated | 10 | 10 | 10 | 10 | 10 | 10 | 10 | 10 | 10 |

(a)=Before germination.   (b)=After germination.
0=Totally destroyed.   10=Undamaged.

EXAMPLE 5

Grain in the two-leaf or dicotyledenous stage and a stand of numerous weeds in the two- to six-leaf stage or paired-leaf stage were treated in a greenhouse with aqueous suspensions containing 3-methyl-5-N-methyl-ureidoisothiazole and the known herbicide N-methyl-N-4-chlorophenyl-urea respectively. The evaluation figures in the following table relate to the effects fourteen days after spraying. While the compound of the invention did not damage the grain and completely destroyed the broad-leafed weeds, the grain was somewhat damaged and its growth was strongly affected by the known urea derivative, and only Galinsoga parviflora, among the weeds tested here, was completely destroyed.

| | Active agents | | |
|---|---|---|---|
| | 3-methyl-5-N-methyl-ureido-isothiazole | N-methyl-N-4-chloro-phenyl-urea | Untreated |
| Kg./ha | 3 | 3 | |
| Barley | 10 | *9.8 | 10 |
| Oats | 10 | *9.8 | 10 |
| Rye | 10 | *9.8 | 10 |
| Wheat | 10 | *9.8 | 10 |
| Sinapis ssp | 0 | 4 | 10 |
| Senecio vulgaris | 0 | 2 | 10 |
| Matricaria chamomilla | 0 | 4 | 10 |
| Stellaria media | 0 | 1.5 | 10 |
| Galinsoga parviflora | 0 | 0 | 10 |
| Chenopodium album | 0 | 10 | 10 |

*Growth reduced.   0=Totally destroyed.   10=Undamaged.

EXAMPLE 6

Various types of cabbage were planted in sandy soil in fields and radishes were sown, and were treated 2½ weeks later with 3-methyl-5-N-methylureidoisothiazole at a rate of 2 kg. suspended in 1000 liters water per hectare. At the time of spraying, the cabbage was in the four to six leaf stage. The radishes were in the germination to two leaf stage. The weeds present were Chenopolium album with four to six leaves, Spergula arvensis with one to four leaf whorls, and partly older bunches, and Polygonum convolvulus with one to two leaves. The following table shows the results of evaluation four weeks after the treatment. It was found that the 3-methyl-5-N-methylureido-isothiazole of the invention has relatively good selective

EXAMPLE 7

Weeds in open waste land were treated with 3-methyl-5-N-methylureidoisothiazole at a rate of 5 kg. active agent suspended in 800 liters water per hectare. The treatment was successful in almost completely eliminating the weeds present.

|  | 3-methyl-5-N-methyl-ureido-isothiazole | Untreated |
|---|---|---|
| Achillea millefolium | 1 | 10 |
| Tanacetum vulgare | 2 | 10 |

0=Totally destroyed.   10=Undamaged

EXAMPLE 8

Preparation of a wettable powder

The following ingredients were mixed in an air jet mill:

Percent by weight
One of the new active agents of the invention _____ 50
Calcium lignosulfonate _____ 15
Alkylarylpolyglycol ether sulfate _____ 2
Attaclay _____ 33

The herbicidal composition prepared according to Example 8 can be mixed with water to form an aqueous suspension which may be employed as described in the preceding examples.

We claim:
1. 3-methyl-5-N-methyl-ureidoisothiazole.
2. 3-methyl-5-N-ethyl-ureidoisothiazole.
3. 3-methyl-5-n-propyl-ureidoisothiazole.
4. 3-methyl-5-N-isopropyl-ureidoisothiazole.
5. 3-methyl-5-N-n-butyl-ureidoisothiazole.
6. 3-methyl-5-N-cyclohexyl-ureidoisothiazole.
7. 3-methyl-5-N-methyl-thioureidoisothiazole.
8. 3-methyl-5-N-ethyl-thioureidoisothiazole.
9. 3-methyl-5-N-isopropyl-thioureidoisothiazole.
10. 3-methyl-5-N,N-dimethyl-ureidoisothiazole.
11. A compound of the formula

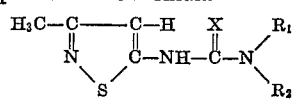

wherein X is oxygen or sulfur, $R_1$ is hydrogen or lower alkyl, and $R_2$ is lower alkyl or cyclohexyl.

References Cited

UNITED STATES PATENTS 2,470,585  5/1949  Sperry ———————— 260—306.8
2,639,285  5/1953  Sondern et al. ———— 260—306.8

NICHOLAS S. RIZZO, *Primary Examiner.*

R. J. GALLAGHER, *Assistant Examiner.*

U.S. Cl. X.R.

71—90